(12) United States Patent
Dey

(10) Patent No.: US 9,268,202 B1
(45) Date of Patent: Feb. 23, 2016

(54) IMAGE GENERATOR AND PROJECTOR

(75) Inventor: Thomas William Dey, Springwater, NY (US)

(73) Assignee: Exelis, Inc., Herndon, VA (US)

( * ) Notice: Subject to any disclaimer, the term of this patent is extended or adjusted under 35 U.S.C. 154(b) by 887 days.

(21) Appl. No.: 13/534,452

(22) Filed: Jun. 27, 2012

(51) Int. Cl.
G03B 21/00 (2006.01)

(52) U.S. Cl.
CPC ...................................... *G03B 21/00* (2013.01)

(58) Field of Classification Search
CPC ........... F41G 7/001–7/006; F41G 3/26; F41G 3/326; F41J 2/02; F41A 33/02
USPC .......................................................... 353/11
See application file for complete search history.

(56) References Cited

U.S. PATENT DOCUMENTS

| | | | |
|---|---|---|---|
| 4,021,662 A * | 5/1977 | Mimms ...................... | 250/252.1 |
| 5,457,493 A | 10/1995 | Leddy et al. | |
| 5,803,570 A * | 9/1998 | Chen et al. ................... | 353/122 |
| 6,635,892 B2 | 10/2003 | Kelly, Jr. et al. | |
| 2011/0019154 A1 | 1/2011 | Jennings et al. | |

* cited by examiner

*Primary Examiner* — Sultan Chowdhury
*Assistant Examiner* — Danell L Owens
(74) *Attorney, Agent, or Firm* — RatnerPrestia (57) ABSTRACT

A generator and projector system for providing a test target for testing sensing apparatus includes an aperture stop located adjacent to the sensing apparatus. Also included are a spherical mirror having a concave side facing the aperture stop and an object disposed between the spherical mirror and the aperture stop. The object includes various test targets for testing the sensing apparatus. A longitudinal optical axis passes through the aperture stop, the spherical mirror and the object. Illumination of the object generates the test target, which is then reflected from the spherical mirror toward the aperture stop, for testing the sensing apparatus.

20 Claims, 13 Drawing Sheets

IMAGE GENERATOR AND PROJECTOR

FIELD OF THE INVENTION

The present invention relates, in general, to scene generation systems for testing image sensors, such as infrared (IR) sensors and visible imaging sensors. More specifically, the present invention relates to an image scene generator and projector for end-to-end testing of multiple image sensors that are capable of viewing a very wide field-of-view (FOV).

BACKGROUND OF THE INVENTION

It is desirable to generate a synthetic scene for testing and calibrating various image sensors, such as visible, ultraviolet and infrared (IR) imaging devices. There has been progress in developing scene projectors for use in Hardware-in-the-Loop (HWIL) Simulations that are capable of end-to-end testing and calibration of imaging devices, or sensors.

For example, it is common to incorporate seekers into missiles, for guiding the missile onto a target. When a new missile is developed it must be tested to ensure that the design is robust and that it behaves the way it is expected to. Tests are carried out at all stages of development on the components and sub-systems, but a test is needed for the complete, assembled missile, in order to check that the sub-systems work together as intended, and that the missile is capable of doing the job it is required to do. The missile sub-systems can be tested simultaneously in a representative environment by firing the missile against a test target at a missile firing range. This is an essential part of any new missile development program, although it is very expensive and time consuming. A way of significantly reducing the number of missile firings required is to use validated representative performance models. The HWIL testing allows interaction and response of many of the missile sub-systems to be tested repeatedly in a controlled environment, at much lower cost and with much faster timescales than firing trials.

As another example, it is common to incorporate a camera into a turret disposed in the nose of a military aircraft. An end-to-end test of the camera may provide an image simulation system having a scene generator that creates a visible image and projects that image toward the camera. Typically, the scene generator may be a workstation or minicomputer having software necessary to generate the digital scene data, at a rate up to and including real-time rate. Depending on the requirements of the camera, the projected image may consist of a simple geometric pattern, or a rendered perspective of many objects. An environmental simulator may also be added to allow motion of the camera under test, by using predetermined motion of the turret. The motion may include roll and pitch that simulate the camera scanning a target of interest on a ground terrain.

Thus, image generators and projectors are known for end-to-end testing and calibration of image sensors. These generators and projectors, however, are limited for producing collimated, but narrow fields-of-view that provide only partial field coverage or are limited in resolution or available aperture, precluding the simultaneous testing of systems comprising a multiplicity of cameras. This effectively limits testing to a single sensor device, or camera at any one time.

Recently, aircraft payloads have included multiple visible cameras and IR cameras installed as an array in a single turret. These cameras operate simultaneously providing an ultra-wide field scene with many entrance pupils that are designed to view a substantially wide area of interest. For example, field coverage may be at least 50 degrees wide, with some coverage requiring up to 80 degrees of width.

Consequently a need has arisen for an ultra-wide field scene generator and projector for qualifying and calibrating multiple camera imagers having many entrance pupils covering, in cooperative combination, a substantially wide field-of-view. The present invention, as will be explained, addresses that need.

SUMMARY OF THE INVENTION

To meet this and other needs, and in view of its purposes, the present invention provides an improved image generator and projector exhibiting desirable and simultaneous characteristics of very wide field, having good resolution over the entire field, fully apochromatic spectral response and an ability to simultaneously feed synthetic far-field imagery to a physically large array of imaging cameras comprising a multiplicity of camera entrance pupils. This has been successfully demonstrated in both design and laboratory demonstration for both visible and infrared cameras. The image generator configuration comprises a single convex spherical object surface whose center of curvature is approximately collocated with the pupils of the cameras under test. The cameras are aimed toward the dark concave interior surface of the spherical object surface, which is in the form of a thin spherical shell centered upon the cameras' pupils. The cameras, focused on the infinitely distant "far field" readily see through a multiplicity of holes in the object surface. These holes are so far out of camera focus that they have virtually no effect upon the imagery resolution characteristics of the cameras. A large concave spherical mirror is located approximately twice the distance from the cameras' pupils and, hence, behind the perforated object surface. This mirror shares the same center of curvature as the camera pupils and object surface. The exterior convex object surface is highly reflective and Lambertian. It may be brightly illuminated by lamps or may even be self-luminous by a mechanism such as phosphorescence. This convex surface further comprises dark features that provide object structure. The perforations themselves provide additional useful structure when considered as small dark objects.

An embodiment of the present invention is a generator for generating a target image for testing sensing apparatus. The generator includes an aperture stop located adjacent to the sensing apparatus under test, a spherical mirror having a concave side facing the aperture stop, an object disposed between the spherical mirror and the aperture stop. A longitudinal optical axis passes through the aperture stop, the spherical mirror and the object. Illumination of the object generates the target image, which is then reflected from the spherical mirror toward the aperture stop, for testing the sensing apparatus.

The object is configured to have a convex surface facing the spherical mirror, and the convex surface may include multiple perforations. The convex surface may also include a clear spherical optical shell with structured object features. The clear optical shell includes an inflated elastic pellicle membrane.

A ground scene may be placed upon the convex surface for reflecting as a target image. Fiducials may be placed upon the convex surface for reflecting as a target image.

The generator may also include: an aspheric lens configured as a corrector plate disposed at the aperture stop for correcting spherical aberrations of the spherical mirror.

Another embodiment of the present invention is a test set for testing multiple sensing devices, in which the sensing devices include multiple entrance pupils arranged across a large area for viewing a target image. The test set includes:

a housing including an aperture stop, a spherical mirror and an object, the aperture stop having a diameter sufficiently large to view the multiple entrance pupils, and the aperture stop arranged to face and surround the entrance pupils, the spherical mirror having a concave side facing the aperture stop, the object disposed between the spherical mirror and the aperture stop, a longitudinal optical axis passing through the aperture stop, the spherical mirror and the object, and an illumination device for illuminating the object.

Illumination of the object generates the target image, which is then reflected from the spherical mirror toward the aperture stop, and collimated for viewing by the sensing devices. The object includes a plate which is perpendicular to the optical axis, and the plate includes multiple perforations located about the optical axis.

The multiple perforations may be arranged to depict a scene. The surface containing the multiple perforations may include fiducials.

Yet another embodiment of the present invention is a housing that includes a spherical mirror, an aperture stop and a focal area for the spherical mirror. The focal area is located between the aperture stop and the spherical mirror. A light is included for illuminating the focal area. When the light illuminates the focal area, the spherical mirror is configured to reflect the focal area toward the aperture stop. The focal area includes a plate, and the plate includes multiple perforations for allowing the light to reflect toward the aperture stop. The surface containing the multiple perforations are arranged to depict an object, and the light impinging through the multiple perforations is effective in projecting the object toward the aperture stop.

It is understood that the foregoing general description and the following detailed description are exemplary, but are not restrictive, of the invention.

BRIEF DESCRIPTION OF THE DRAWINGS

The invention may be best understood from the following detailed description when read in connection with the accompanying drawings.

DETAILED DESCRIPTION OF THE INVENTION

As will now be explained, with reference to the figures, the present invention provides an image generator and projector for end-to-end testing of multiple image sensors that are simultaneously capable of viewing a very wide field-of-view (FOV). The FOV may for example, accommodate fully 76° visible and/or IR imaging of a target of interest. The image projector of the present invention is capable of generating and projecting a collimated test target toward the multiple image sensors for simulating a very wide scene for viewing by the image sensors, covering as much as a 76° FOV and beyond.

Figure 1:
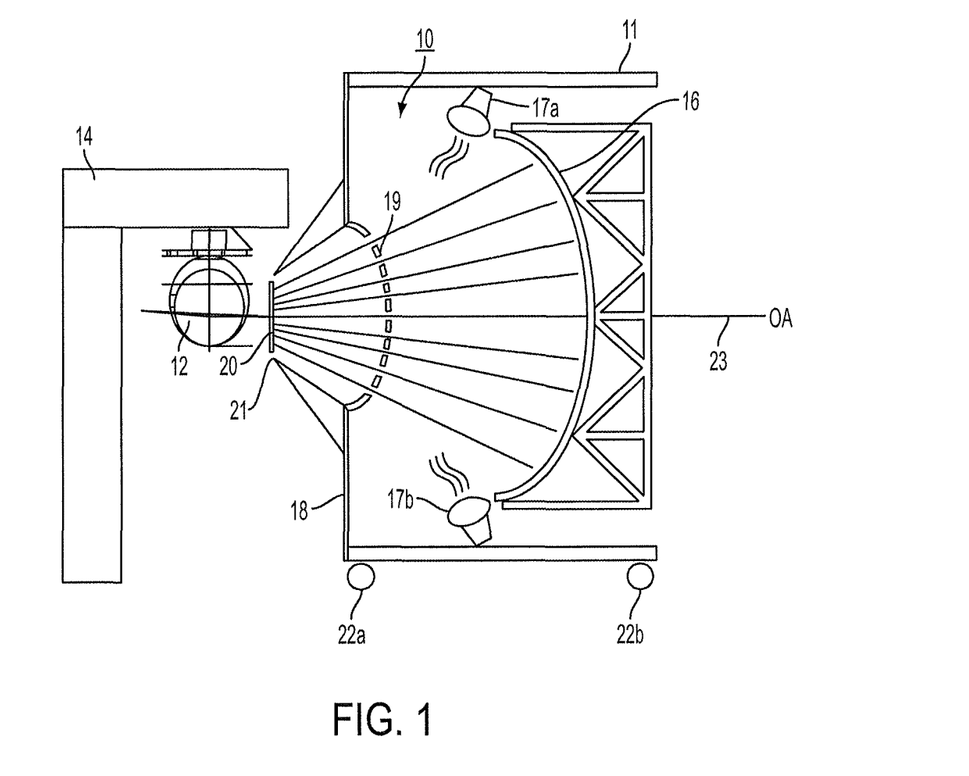
FIG. 1 is an image generator and projector system for testing multiple cameras, in accordance with an embodiment of the present invention.
Figure 2:
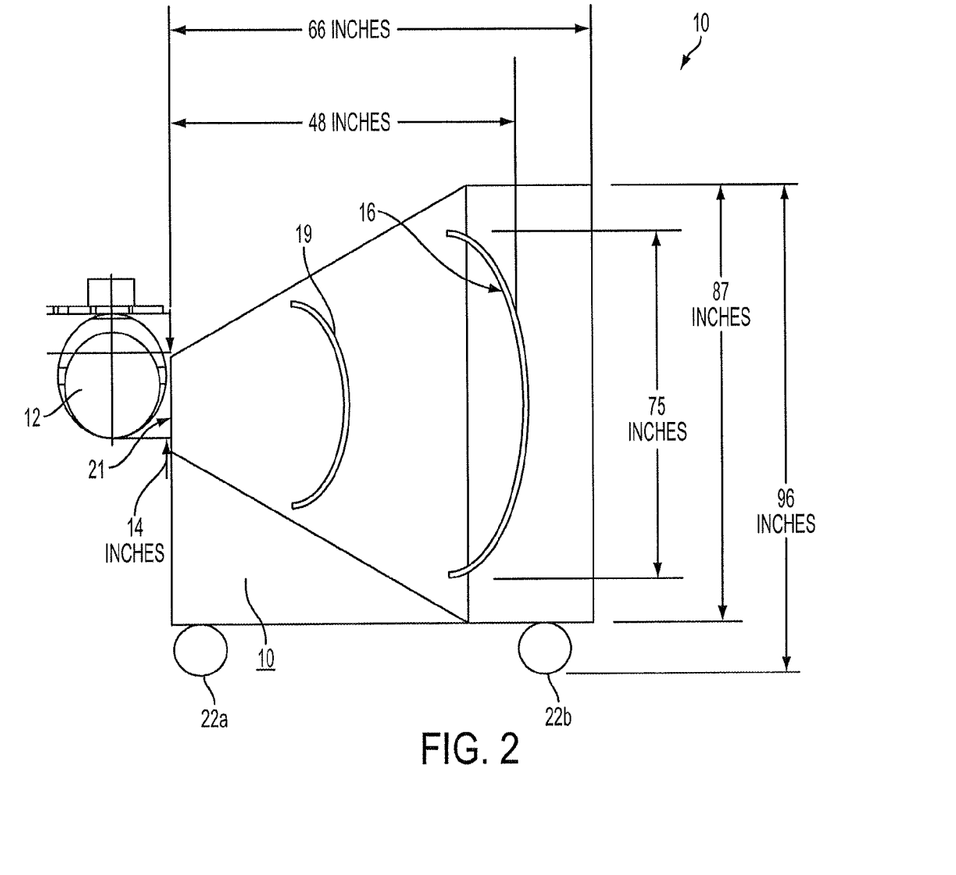
FIG. 2 is an example of dimensions for an image generator and projector system for testing multiple cameras, in accordance with an embodiment of the present invention.

Referring first to FIGS. 1 and 2, there is shown an image generator and projector system, generally designated as 10. As shown, system 10 includes a large housing 11, which may be 96 inches in height, 96 inches in width, and 66 inches in depth (as an example). The housing 11 includes a spherical mirror 16, a target object 19, and an opening for providing an aperture stop, the latter designated as 21. The aperture stop 21 may optionally include an aspheric lens 20 (described later), as shown in FIG. 1 (not included in FIG. 2). Illuminators, such as lights 17a and 17b are also included in housing 11 for illuminating target object 19. The illuminators may provide light in different bandwidths depending on whether it is desired to test IR imagers, ultraviolet imagers, or visible imagers.

As shown in FIG. 1, target object 19 includes multiple perforations, so that light reflected from the surface of target object 19 may pass through the perforations after reflecting from spherical mirror 16 and, hence, proceed unimpeded to and through aperture stop 21. The spherical mirror 16 is configured to reflect the light, back through the perforations, and collimate the light at aperture stop 21. The target object 19 is thus successfully imaged infinitely far away as seen from aperture stop 21.

Since image generator and projector system 10 includes caster wheels 22a and 22b, disposed at the lower portion of housing 11, system 10 may be easily moved, so that optical axis 23 is aligned with the optical center of turret 12. As shown, the turret is suspended from platform 14, which may be raised, or lowered to facilitate alignment of optical axis 23 with the optical center of turret 12.

As an example of dimensions for the various elements in system 10, reference is now made to the embodiment shown in FIGS. 1 and 2. As shown, aperture stop 21 is 14 inches in diameter, and spherical mirror 16 is 75 inches in diameter. The spherical mirror has a concave surface facing the aperture stop, and target object 19 has a concave surface facing the same aperture stop. As shown in FIG. 1, target object 19 forms a portion of holding plate 18, and includes a test object (described later). The target object 19 is located about the central area of holding plate 18, and a center point of the target object is approximately aligned with optical axis 23. Other methods of supporting the referenced optical components are not precluded.

All the optical elements in housing 11, namely, the spherical mirror, target object, the aspheric lens and the aperture stop are aligned to each other, so that optical axis 23 passes through the approximate central points of each respective optical element.

It will be appreciated that spherical mirror 16 has a focal point at the intersection of optical axis 23 and target object 19. The target object 19 is located approximately midway between spherical mirror 16 and aperture stop 21. For example, an actual constructed spherical mirror, used for demonstration purposes, has an 80 inch radius and a 16 inch diameter (sag portion). In addition, the mirror has an effective focal point (EFL) of 40 inches from the mirror surface. Thus, the aperture stop is located 80 inches from the spherical mirror, with the target object located in the middle, or 40 inches away from the spherical mirror.

Figure 3:
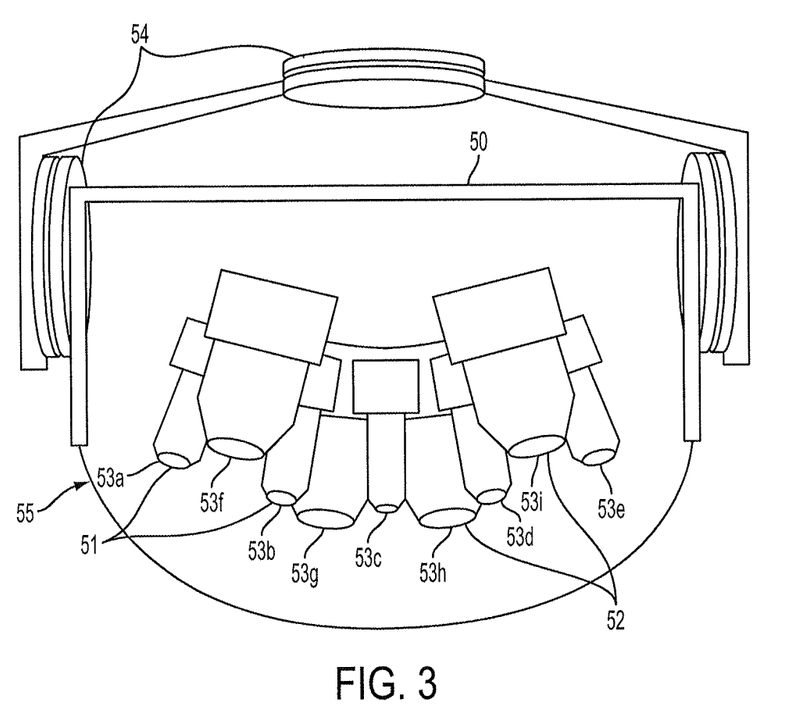
FIG. 3 is an example of an array of multiple cameras arranged in the turret of an aircraft for viewing a wide field-of-view.

An example of an arrayed arrangement of multiple imagers, for which the present invention may be used as an end-to-end testing system, is shown in FIG. 3. As shown, the arrayed arrangement is enclosed in a ball turret housing 50. It is shown pointing generally downward, as it could be in field deployment. It can also be pointed generally sideways, or at any angle to accommodate the axis of the image generator when being tested. In this example, five visible cameras 51 and four infrared cameras 52 are shown. Each referenced camera further comprised its own camera entrance pupil 53a through 53i. The pupils are necessarily disjoint and splayed over a substantial area. This area can subtend a circumscribing circular footprint as large as fourteen inches. The figure also shows altitude-azimuth gimbals 54 in a traditional English Yoke configuration for pointing the ensemble of cameras in any desired direction. Also shown is a protective window 55. This window may be monolithic as depicted, or may comprise a multiplicity of sub-apertured flat windows which address each camera. The latter is often preferred so that the windows may accommodate the wavelength bandpass characteristics of each camera.

Figure 4:
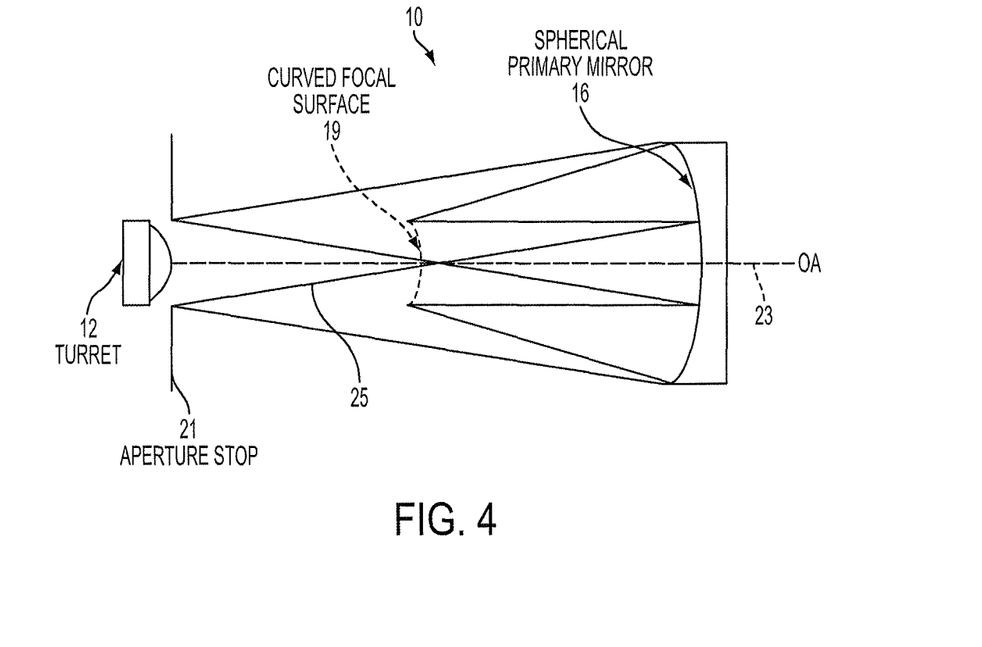
FIG. 4 is a schematic of the path of light in the image generator and projector system of FIG. 1.

Referring next to FIG. 4, there is shown a schematic diagram of light rays reflecting from spherical mirror 16 in image generator and projector system 10. For explanation purpose, system 10 includes the same numerical designations as the numerical designations shown in FIGS. 1 and 2. Thus, system 10 includes spherical mirror 16, target object 19 (shown as curved focal surface 19) and aperture stop 21. The optical axis 23 passes through the focal point of spherical mirror 16, in which the focal point is located at the approximate center of curved focal surface 19. The optical axis also passes through the approximate center of aperture stop 21 and optical center of turret 12. The light (provided by illuminators 17a and 17b in FIG. 1) are effective in projecting a test target (described later), which is formed by target object 19, onto spherical mirror 16. In turn, the light is reflected from spherical mirror 16 toward aperture stop 21. In addition, the light is collimated at the aperture stop. In this manner, system 10 is configured to project a wide beam of light toward the multiple imaging sensors in turret 12.

As shown in FIG. 4, system 10 does not include a corrector plate, or an aspheric lens at the aperture stop. The system, thus, accepts some degradation of image sharpness due to spherical aberrations in spherical mirror 16. When a corrector plate is added, such as aspheric lens 20 shown in FIG. 1, however, a sharp, bright and wide-field image is projected toward turret 12.

The scene generator and projector system of the present invention provides an ultra-wide field scene for testing, qualifying and quantifying multiple camera imagers that comprise many entrance pupils for viewing' a substantial area. This area may be at least 50° wide, and may be up to 80° wide. Having such a wide field collimator advantageously allows a test object to be viewed simultaneously by all the cameras in the turret.

Figure 5A:
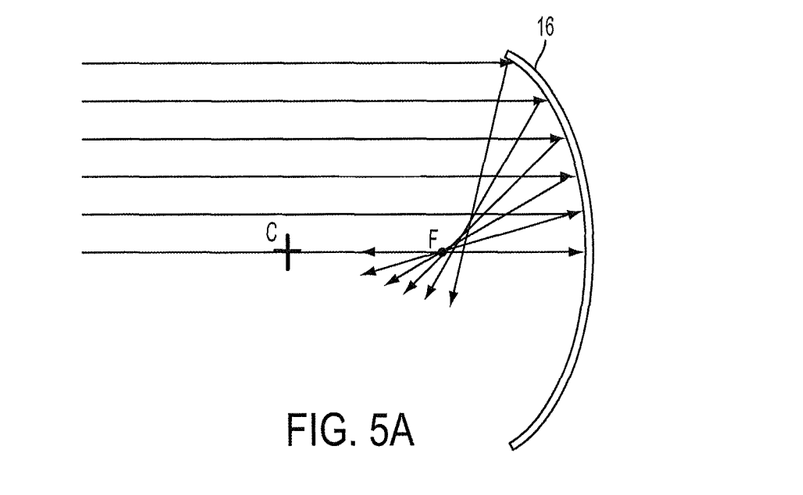
FIG. 5A depicts a collimated beam of light reflected from a spherical mirror with a focal point at "F".
Figure 5B:
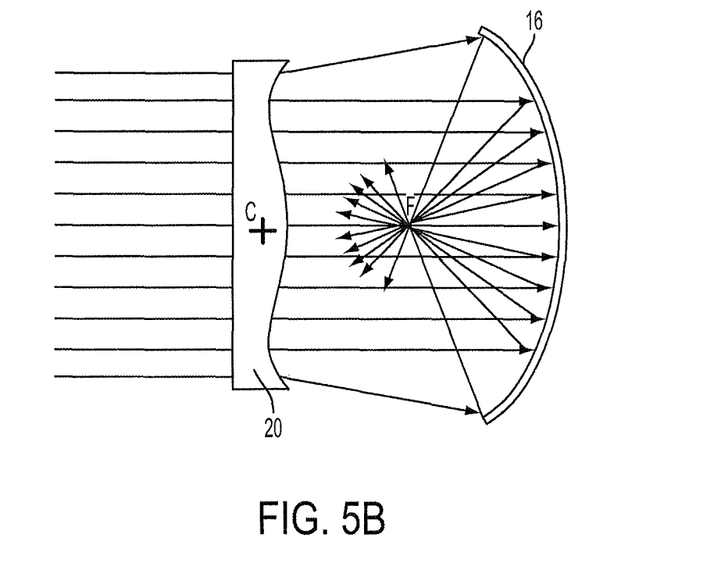
FIG. 5B depicts a collimated beam of light reflected from the spherical mirror of FIG. 5A, which has been corrected by an aspheric lens.
Figure 5C:
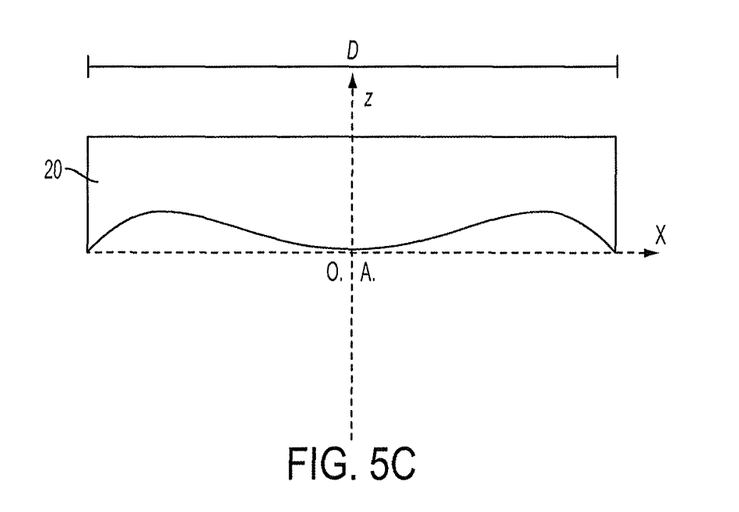
FIG. 5C depicts an exaggerated version of the aspheric lens shown in FIG. 5B.

Referring next to FIGS. 5A, 5B and 5C, a corrector plate 20 is shown, which is located at approximately two times the distance between spherical mirror 16 and focal point "F" of the spherical mirror. The corrector plate 20 is an aspheric lens that is configured to correct the spherical aberration of mirror 16. The corrector plate may also be located at aperture stop 21 of image generator and projector system 10, as shown in FIG. 1. The corrector plate is effective in correcting errors of the spherical mirror and providing a collimated beam at infinity, or the viewing plane of the arrayed imagers in turret 12. As an aspheric lens, the corrector plate has a spherical aberration that is equal and opposite to that of the spherical mirror. The corrector plate is placed at the approximate center of curvature, designated as "C", of the mirror.

The corrector plate, as shown in FIG. 5C, is thicker in the middle and at the edge. This corrects the light path so that light reflected from the outer part of the mirror and light reflected from the inner part of the mirror are brought to the same common focal point "F". Hence, when used as a projector, all rays emanating from any point on the curved focal surface 19 of FIG. 4 and reflecting from spherical mirror 16, upon passing through corrector plate 20, will be ideally collimated. The corrector plate 20 only corrects for spherical aberration and does not change the focal length of the system.

It will be appreciated, by those skilled in the art, that the cross-section of the corrector plate shown in FIG. 5C is exaggerated. The real curves of the corrector plate are hard to detect visually. This gives the corrector plate an appearance of being an optically flat window, as shown in FIG. 1.

Having described the relationship among spherical mirror 16, curved focal surface 19 and aperture stop 21 (with or without corrector plate 20), it may be realized that system 10 is similar to a Schmidt telescope. As known, a Schmidt telescope provides a wide field-of-view of the night-sky. Its optical components include a primary spherical mirror and an aspheric correcting lens. The correcting lens is located at the center of curvature of the primary mirror, as shown in FIG.

5B. The Schmidt telescope also includes a film plate, or a focal planar array (FPA) that is located inside the telescope, at the prime focus of the primary mirror. The film plate, or FPA is curved to correspond to the same center of curvature as the curved focal plane of the Schmidt primary mirror. The Schmidt telescope is typically used in situations requiring viewing of a large sector of the night-sky.

Thus, whereas the Schmidt telescope is used to capture an image of a wide FOV from infinity, the present invention, on the other hand, is used to project a wide collimated beam towards infinity for testing purposes. Whereas an imaging device, or an FPA is placed at the focal point of the Schmidt telescope, a target image is placed at the focal point of the spherical mirror of the present invention. Whereas the FPA, or film plate in the Schmidt telescope is opaque to light, the target object of the present invention permits light to pass through its test target for projection toward infinity.

Figure 6:
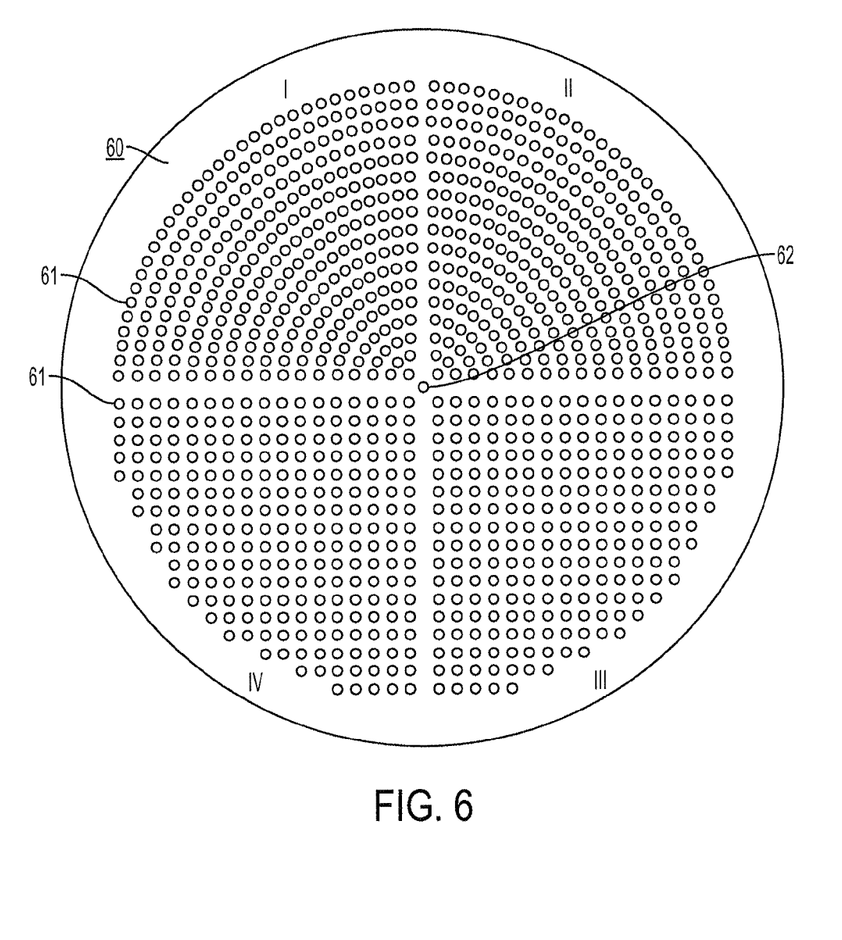
FIG. 6 is a schematic of a perforated target object used in the image generator and projector system shown in FIG. 1, in accordance with an embodiment of the present invention.

The target object and test target of the present invention will now be described in greater detail. Referring first to FIG. 6, there is shown an exemplary embodiment of a target object, generally designated as 60. It will be appreciated that target object 60 has a curved surface with multiple perforations and may be part of a larger plate, as shown in FIG. 1 (target object 19 in FIG. 1 is located in the central portion of holding plate 18).

In order to demonstrate that a perforated plate, such as target object 19, permits light to be collimated by spherical mirror 16 at aperture stop 21, the inventor constructed a perforated plate, such as target object 60. The target object includes multiple perforations 61 that surround centered perforation 62. Four quadrants of perforations are shown, in which the first (I) and second (II) quadrants include perforations 61 extending radially away from centered perforation 62; and the third (III) and fourth (IV) quadrants include perforations 61 extending in horizontal rows and vertical columns away from centered perforation 62. In aligning target object 60 with spherical mirror 16 and aperture stop 21, optical axis 23 (FIG. 1) is configured to pass through centered perforation 62.

The inventor discovered that any one of the quadrants in FIG. 6 is as effective as any other of the quadrants in allowing light to be collimated by spherical mirror 16 onto imaging devices under test (for example, the imaging cameras in turret 12).

Figure 10:
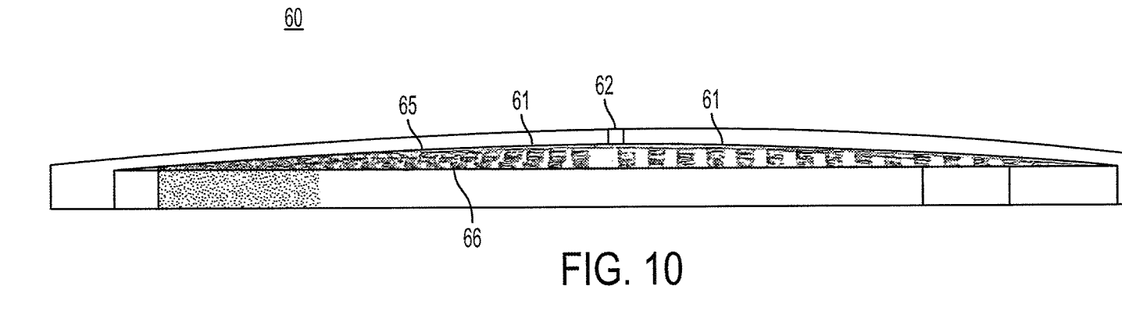
FIG. 10 is a cross-section of an exemplary target object including multiple perforations, in accordance with an embodiment of the present invention.

It will be appreciated that in the example shown in FIG. 6, example target object 60 is about 8 inches in diameter and perforations 61 and 62 are approximately 3/16 inches in diameter. In the example, target object 60 includes two surfaces, as shown in FIG. 10 The first surface 66 is a convex sphere whose center of curvature is coincident with the center of curvature of spherical primary mirror 16. The second surface 65 is a concave sphere with the same center of curvature. Target object 60 thus is in the form of a thin spherical shell. The perforations 61 extend through both surfaces. Surface 65 is oriented to face spherical mirror 16, and surface 66 is oriented to face aperture stop 21.

It will further be appreciated that the inventor discovered that as long as the entrance pupils of the multiple cameras in turret 12 subtend many perforations 61, the image resolution seen by each camera is essentially identical to a camera viewing an unobstructed view; only the image brightness is affected. Stated differently, the multiple cameras under test are effectively viewing a test target of a target object without "seeing" the perforations. Thus, spherical mirror 16 "sees" a test target near the focal center of target object 60 (for example) and projects the test target toward the imaging devices. By using an illuminator (for example, lights 17a and 17b) in the bandwidth of interest (for example, IR, ultraviolet, or visible) to illuminate the test target, the imaging devices under test "see" a collimated test target viewed at infinity.

Figure 7A:
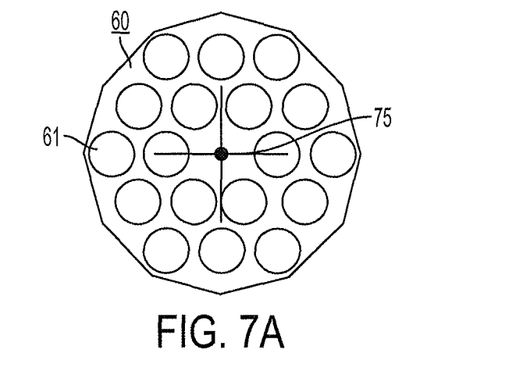
FIG. 7A is a schematic of a perforated target object including a test target that resembles a cross with a small central dot, in accordance with an embodiment of the present invention.
Figure 7B:
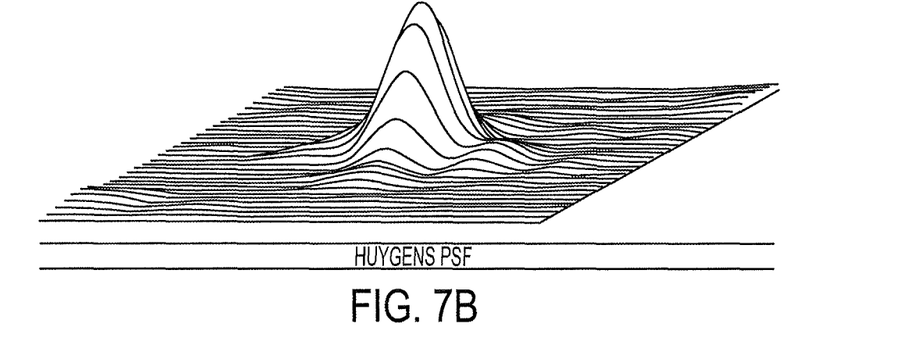
FIG. 7B is a graph of the theoretical intensity profile seen by a camera when viewing the test target of FIG. 7A.
Figure 7C:
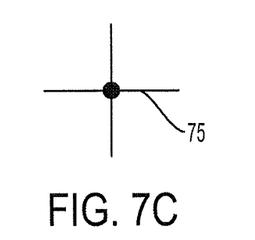
FIG. 7C is a schematic of a test target that resembles a cross with a small central dot, but without the perforated target object of FIG. 7A.
Figure 7D:
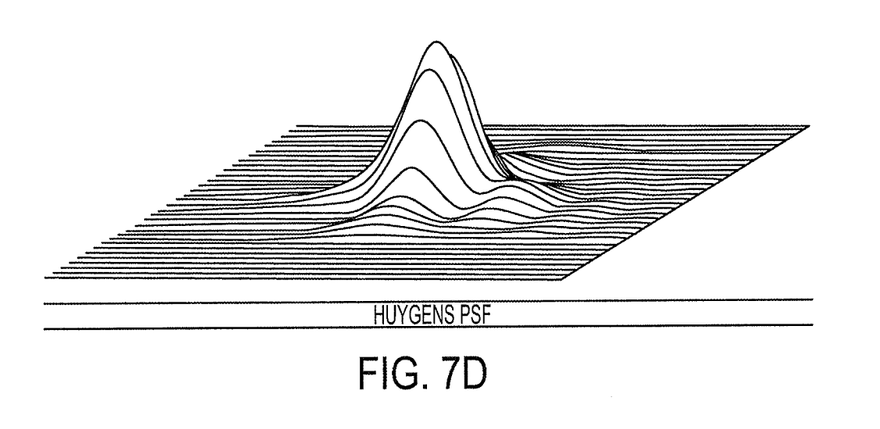
FIG. 7D is a graph of the theoretical intensity profile seen by a camera when viewing the test target of FIG. 7C.

Referring now to FIGS. 7A through 7D, the resolution characteristics of light (plotted as a Huygens PSF) that a camera sees upon viewing test target 75 (a cross) through perforations 61 of target object 60 is similar to the resolution characteristics of light seen by the same camera upon viewing the same test target 75 (the cross) without being obstructed by the perforated surface of target object 60. Thus, the present invention advantageously collimates test target (cross) 75 in FIG. 7A when it is part of target object 60, as if the test target (cross) 75 had been collimated by itself, as shown in FIG. 7C.

Figure 8A:
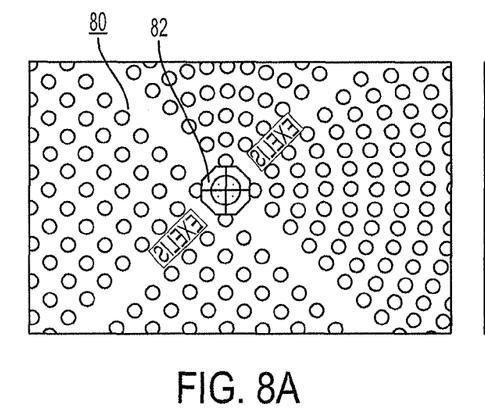
FIG. 8A is another example of a perforated target object including a test target of four fiducials, in accordance with an embodiment of the present invention.
Figure 8B:
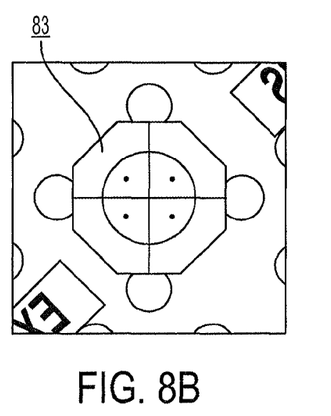
FIG. 8B is an image taken by a camera viewing the test target shown in FIG. 8A.

Various test targets have been placed by the inventor at the spherical center of a target object. Each of these test targets was successfully imaged by a camera focused at infinity. Examples of test targets are shown in FIGS. 8A, 8B, 9A, and 9B. The FIG. 8A shows a test target including four fiducials, generally designated as 82, which is placed at the center of perforated target object 80. The FIG. 8B shows an image, generally designated as 83, taken by a 100 mm f/4 camera focused on a far field, via spherical mirror 16 located behind the target object.

Figure 9A:
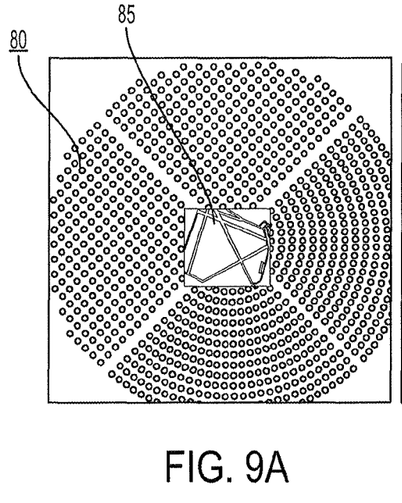
FIG. 9A is yet another example of a perforated target object including a test target of an airport runway, in accordance with an embodiment of the present.
Figure 9B:
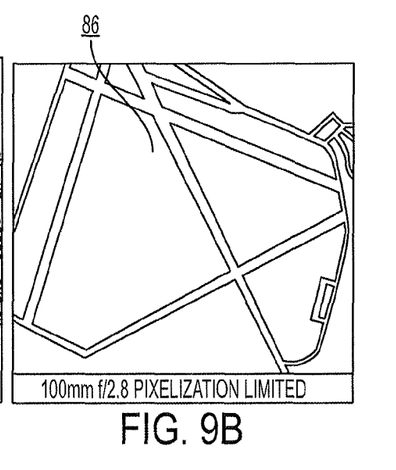
FIG. 9B is an image taken by a camera viewing the test target shown in FIG. 9A.

Referring next to FIG. 9A, there is shown another example of perforated target object 80 including a test target of an airport runway, generally designated as 85. Similar to the test target of FIG. 8A, test target 85 is located adjacent the focal point of spherical mirror 16 and adjacent a center location of the curved, perforated target object 80. It will be understood that target object 80 is located between spherical mirror 16 and aperture stop 21, similar to the location of target object 19 shown in FIG. 1. The FIG. 9B is an image, generally designated as 86, taken by another 100 mm f/4 camera focused on a far field, via spherical mirror 16 located behind the target object.

Figure 12:
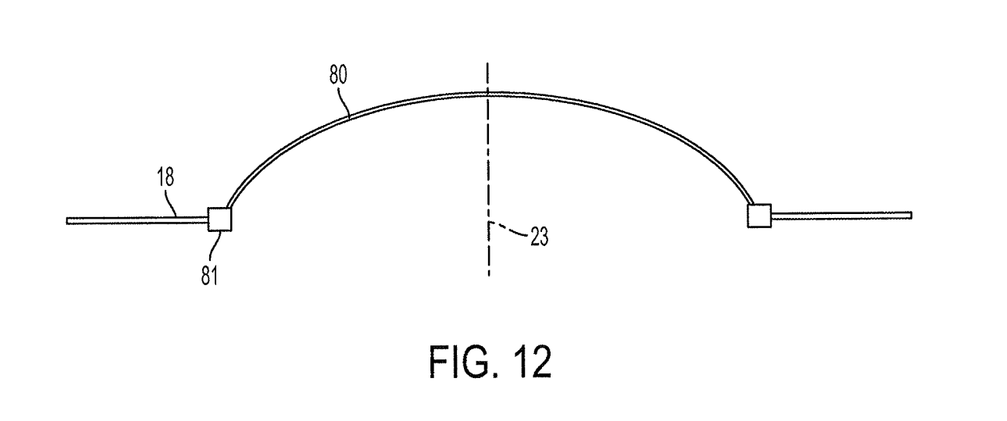
FIG. 12 is a schematic rendition of a non-perforated object target comprising a clear spherical shell, in accordance with an embodiment of the present invention.

Referring to FIG. 12, an embodiment comprising a non-perforated, clear, curved focal surface alternative target 80, is depicted. Stiffening support ring 81 helps maintain the location and stiffness of the delicate clear shell, which may be made of glass. In this embodiment, the clarity of the material precludes the need for perforations because the light transmits through the surface and body of the material. The advantage is that formation of perforations is precluded. The disadvantage is that the clear material itself is fragile and introduces aberrations and deviations into the transmitted light, degrading the image quality.

Figure 13:
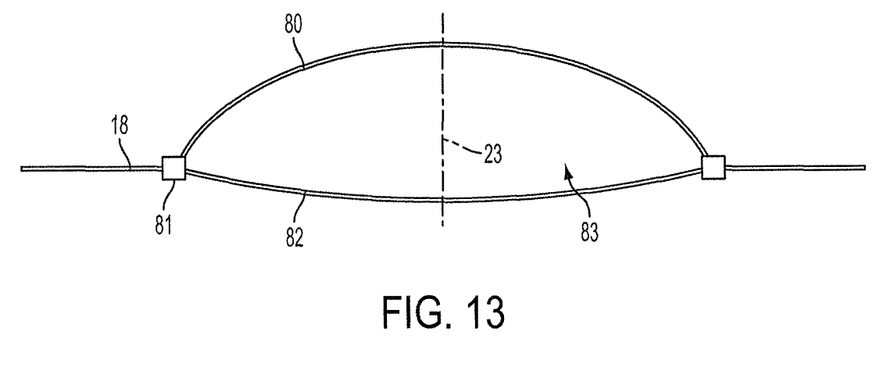
FIG. 13 is a schematic rendition of a non-perforated object target comprising a clear spherical shell in the form of an inflated pellicle membrane, in accordance with an embodiment of the present invention.

Referring to FIG. 13, an embodiment comprising a non-perforated, clear, curved focal surface alternative target object 80, is depicted. An additional clear surface 82 seals the cavity 83 between these two clear surfaces. Stiffening support ring 81 helps maintain the location and stiffness of the delicate clear shells, which may be made of thin optical pellicle material. The cavity is pressurized to inflate the elastic surfaces into a natural spherical shape. The radius of the target surface 80 is readily adjusted and controlled by regulating the pressure via a thin hose (not shown) that feeds the interior via the hollow support ring 81. In this embodiment, the clarity of the material precludes the need for perforations because the light transmits through the surface and body of the material. The advantage is that formation of perforations is precluded. The disadvantage is that the clear material itself is fragile. Clear elastic material 80 is preferably more pliant than material 82 so that it forms a relatively more curved sphere.

It is to be appreciated that the most desirable characteristics of object surfaces (some embodiments which have been described) include sphericity, clarity or perforations and good wavefront transmission.

Figure 11A:
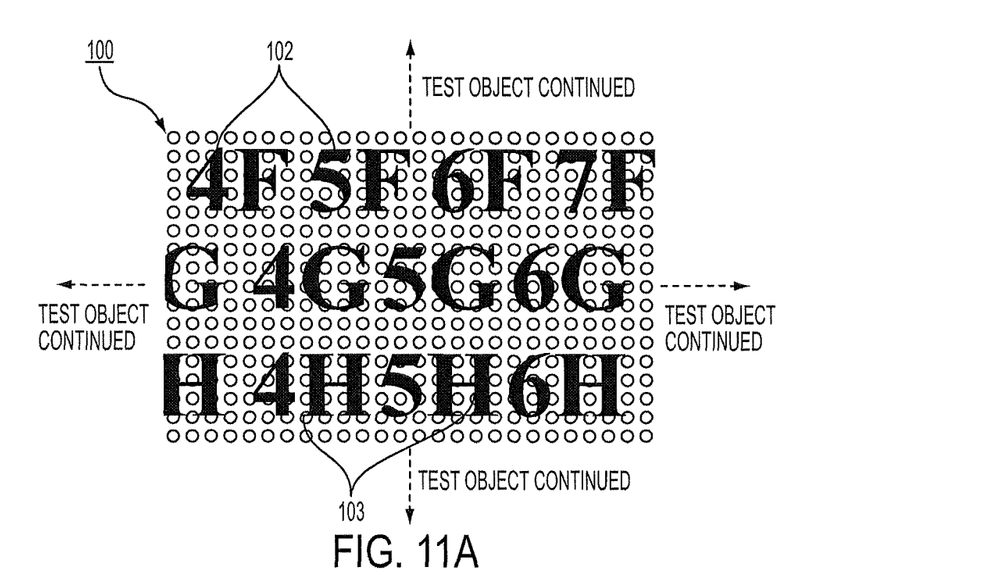
FIG. 11A is still another example of a perforated target object including a test target having multiple rows and columns of numbers and letters, in accordance with an embodiment of the present invention.
Figure 11B:
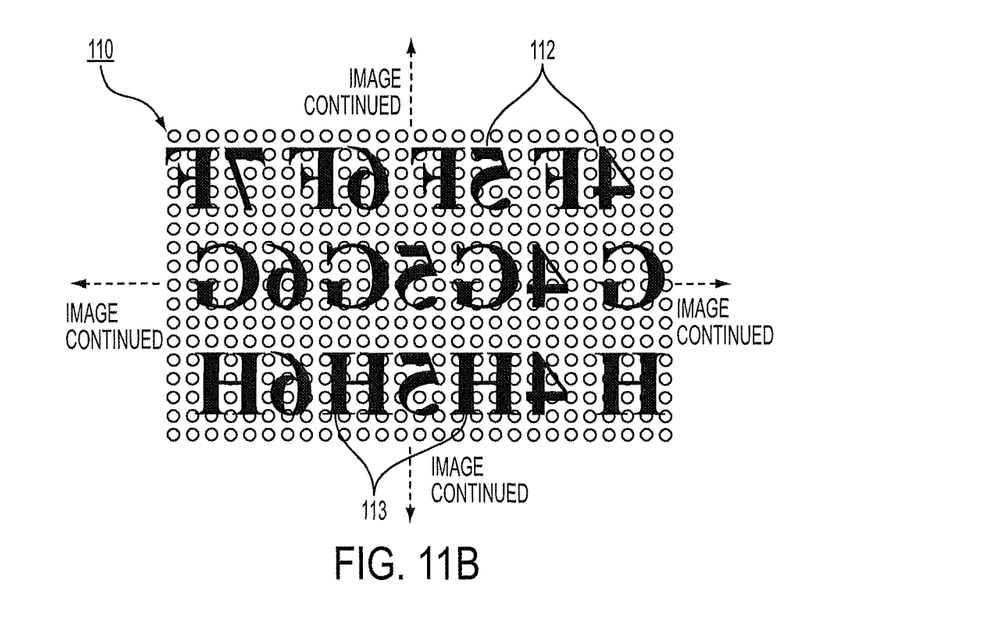
FIG. 11B is an image of the perforated target object including the test target shown in FIG. 11A, in accordance with an embodiment of the present invention.

Referring lastly to FIGS. 11A and 11B, there is shown yet another example of a test target. As shown in FIG. 11A, perforated target object 100 includes a matrix of black letters and numbers. For example, "4F" and "5F", which are adjacent each other in the same row, are designated collectively as 102. Similarly, "4H" and "5H", which are adjacent each other in a different row, are designated collectively as 103. It will be understood that additional rows and columns of letters and numbers, in four different directions, extend from a central point (containing optical axis 23). Only a small area about the central region of target object 100 is shown in FIG. 11A.

The lettered rows and numbered columns provide overt information to a sub-field camera, when the camera is viewing a far field object at infinity. The angular location of the letters and numbers provides a simulated object-space field angle mapping capability.

The image of target object 100 is seen by a camera under test in the far field (at infinity) as shown in FIG. 11B. As shown, image 110 is an inverse mirror image of the test object shown in FIG. 11A. The image 110 includes the inverse of "4F" and "5F", collectively designated as 112. In addition, image 110 includes the inverse of "4H" and "5H", collectively designated as 113. Again, it will be understood that only a central portion of the image is shown in FIG. 11B. Thus, the image is continued in four different directions extending from a central region of target image 110. Since the image has a wide field-of-view, multiple cameras may be tested with each camera having a different viewing angle for viewing a portion of the test target at a respective angular field.

Thus, the present invention provides a test target which is projected at a far-field (at infinity) and viewed in sectors by an array of cameras under test. As long as the entrance pupils of the cameras under test subtend many perforations in target object 19 (FIG. 1), the image resolution provided by the present invention is essentially identical to an unobstructed scene viewed by a camera under test focused at a far-field (infinity).

By providing a test target, such as the black letters and black numbers in an arrayed pattern (FIG. 11A), a good overt mapping of each and every perforation hole of a test target is imaged at a far-field (infinity). Each camera sees some sub-region of the test target that maps to a feature in the image at a specific angular field space. The perforations and lettering (especially the edges of the lettering) provide a good resolution target structure. Accordingly, the test program has knowledge of image sharpness/resolution, camera pointing (local boresight), field distortion, image scale, focal length certification, illumination uniformity, field tilt and image clocking—when the arrayed cameras are interrogated. The test program also has knowledge of field overlap provided by the camera array, thereby, assuring that no "dead zones" or blind spots exist in the camera array. This aides in stitching all images together to achieve an ultra-wide FOV and a seamless rendition so desirable to the end user. The camera product being tested, calibrated, aligned and certified enjoys a virtual reality of object-space immersion.

In general, the target object 19 may have any test target (such as 102, 103, 82, or 85) that is viewed through the perforations to see an image of its far side reflected from a spherical mirror. The target object comprises a thin opaque shell with a convex exterior surface 65 (FIG. 10) painted Lambertian white, and includes structured test targets having light and dark areas. The concave interior surface 66 (FIG. 10) of the test target is very dark and preferably black.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A generator for generating a target image for testing sensing apparatus comprising:
   an aperture stop located adjacent to the sensing apparatus under test,
   a spherical mirror having a concave side facing the aperture stop,
   an object disposed between the spherical mirror and the aperture stop, wherein:
      a center point of the object is located at a focal point of the spherical mirror, and
      a longitudinal optical axis passes through the aperture stop, the spherical mirror and the object, and
         illumination of the object generates the target image, which is then reflected from the spherical mirror toward the aperture stop, for testing the sensing apparatus.

2. The generator of claim 1 wherein
   the object is configured to have a convex surface facing the spherical mirror, and
   the convex surface includes multiple perforations.

3. The generator of claim 1 wherein
   the object is configured to have a convex surface facing the spherical mirror, and
   the convex surface includes a clear spherical optical shell with structured object features.

4. The generator of claim 3 wherein the clear optical shell includes an inflated elastic pellicle membrane.

5. The generator of claim 2 wherein a ground scene is placed upon the convex surface for reflecting as a target image.

6. The generator of claim 2 wherein fiducials are placed upon the convex surface for reflecting as a target image.

7. The generator of claim 1 further including:
   an aspheric lens configured as a corrector plate disposed at the aperture stop for correcting spherical aberrations of the spherical mirror.

8. The generator of claim 1 wherein
   the spherical mirror has a diameter greater than 50 inches for providing a collimated beam of the object at an infinite distance, and
   the collimated beam includes a field of view of at least 50 degrees.

9. A test set for testing multiple sensing devices, in which the sensing devices include multiple entrance pupils arranged across a large area for viewing a target image,
   the test set comprising:
   a housing including an aperture stop, a spherical mirror and an object,
   the aperture stop having a diameter sufficiently large to view the multiple entrance pupils, and the aperture stop arranged to face and surround the entrance pupils,
   the spherical mirror having a concave side facing the aperture stop,
   the object disposed between the spherical mirror and the aperture stop,
   wherein a longitudinal optical axis passes through the aperture stop, the spherical mirror and the object, and
   an illumination device for illuminating the object,
   wherein illumination of the object generates the target image, which is then reflected from the spherical mirror toward the aperture stop, and collimated for viewing by the sensing devices.

10. The test set of claim 9 wherein
the object includes a plate which is perpendicular to the optical axis, and
the plate includes multiple perforations located about the optical axis.

11. The test set of claim 10 wherein
the multiple perforations are arranged to depict a scene, and
illumination of the multiple perforations is configured to project the scene toward the spherical mirror, and upon reflection from the spherical mirror, back through the perforations and toward the aperture stop.

12. The test set of claim 10 wherein
the surface containing the multiple perforations include fiducials, and
illumination of the multiple perforations is configured to project the fiducials toward the spherical mirror, and upon reflection from the spherical mirror, back through the perforations and toward the aperture stop.

13. The test set of claim 10 wherein
the plate includes a convex surface facing the spherical mirror, and
a center point of the convex surface is located at a focal point of the spherical mirror.

14. The test set of claim 9 further including:
an aspheric lens configured as a corrector plate,
wherein the aspheric lens is disposed in the vicinity of the aperture stop for correcting spherical aberrations of the spherical mirror.

15. The test set of claim 9 further including:
a set of wheels for facilitating movement of the test set about the sensing devices.

16. An image projector comprising:
a housing including:
a spherical mirror,
an aperture stop; and
a focal area for the spherical mirror, the focal area located between the aperture stop and the spherical mirror,
wherein the focal area includes a plate having multiple perforations for allowing the light to reflect toward the aperture stop; and
a light for illuminating the focal area,
wherein when the light illuminates the focal area, the spherical mirror is configured to reflect the focal area toward the aperture stop.

17. The image projector of claim 16 wherein:
the surface containing the multiple perforations is arranged to depict an object, and
the light impinging through the multiple perforations is effective in projecting the object toward the aperture stop.

18. The image projector of claim 16 wherein the focal area includes a convex surface facing the spherical mirror, and a center point of the convex surface is located at a focal point of the spherical mirror.

19. The image projector of claim 16 further comprising:
an aspheric lens configured as a corrector plate,
wherein the aspheric lens is disposed in the vicinity of the aperture stop for correcting spherical aberrations of the spherical mirror.

20. The image projector of claim 16 wherein
the housing is configured as a mobile platform, and
the aperture stop is sufficiently wide for the light, upon collimation by the spherical mirror, to impinge upon a cluster of multiple cameras configured to view the focal area.

* * * * *